May 24, 1966     D. BERLIN     3,252,734
CRANK OPERATED CHILD'S CONVERTIBLE BED AND SEAT
Filed June 2, 1964     3 Sheets-Sheet 1

INVENTOR.
DANIEL BERLIN
BY.
Caesar and Rivise
ATTORNEYS.

May 24, 1966  D. BERLIN  3,252,734
CRANK OPERATED CHILD'S CONVERTIBLE BED AND SEAT
Filed June 2, 1964  3 Sheets-Sheet 2
FIG. 3
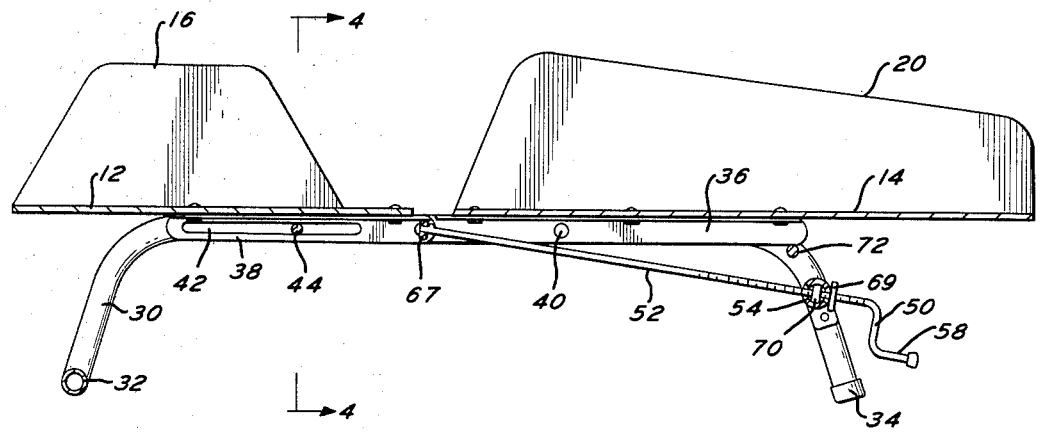
FIG. 4
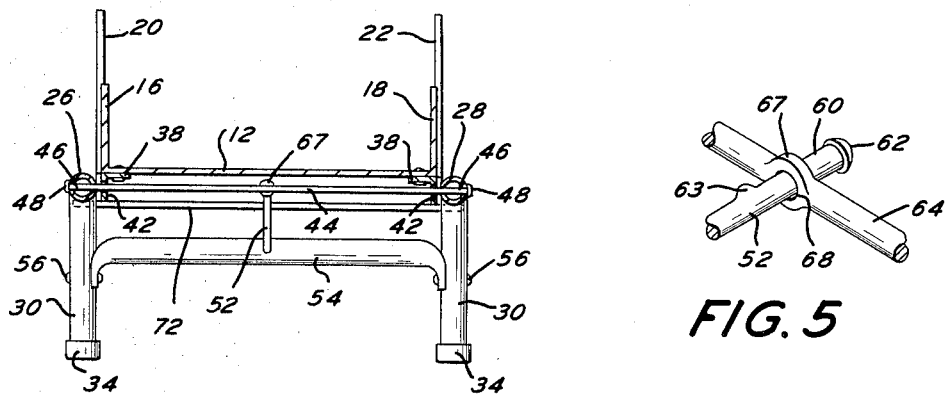
FIG. 5
FIG. 6
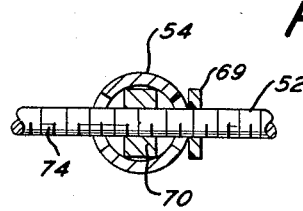
INVENTOR.
DANIEL BERLIN
BY
Caesar and Rivise
ATTORNEYS.

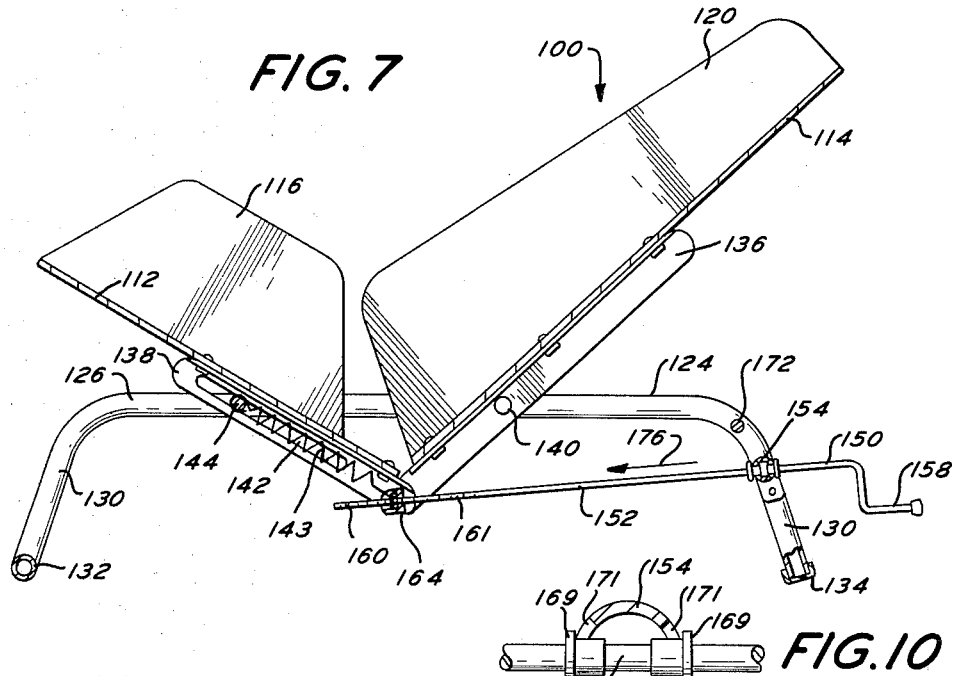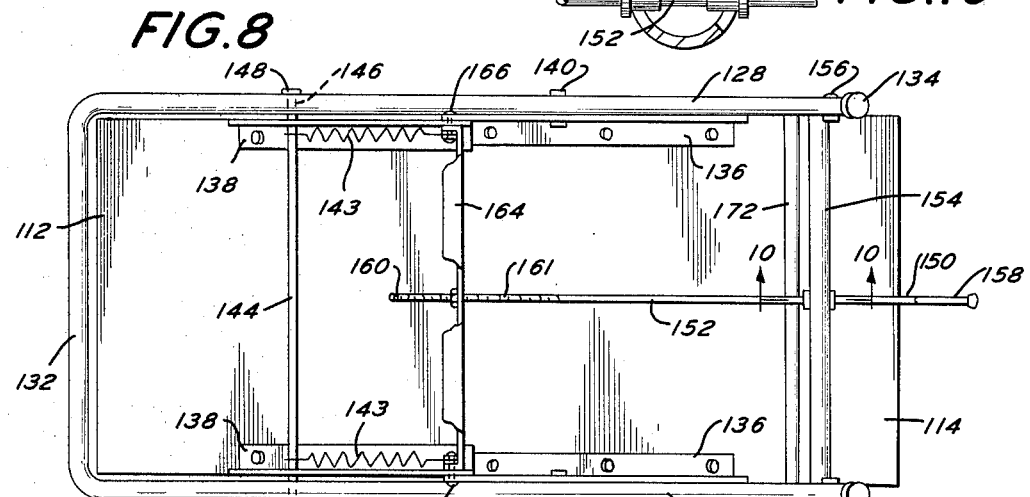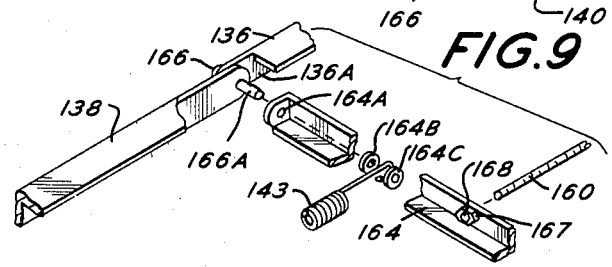

United States Patent Office 3,252,734
Patented May 24, 1966

3,252,734
CRANK OPERATED CHILD'S CONVERTIBLE
BED AND SEAT
Daniel Berlin, 4424 Paul St., Philadelphia, Pa.
Filed June 2, 1964, Ser. No. 374,557
2 Claims. (Cl. 297—317)

This application is a continuation-in-part based on application Serial No. 359,020, filed April 13, 1964, entitled, Crank Operated Child's Convertible Bed and Seat, and now abandoned.

This invention relates to an improved crank operated child's bed and seat and constitutes a new and improved child's convertible bed and seat. It particularly relates to a device providing a variable seat wherein a child may be placed to remain in a given location and which may be converted into a bed should the demands of the particular occasion so require.

It is often necessary that a small child be safely placed in a given location so that he will not fall, crawl, walk away or otherwise harm himself. Towards this end a variety of chairs and other supporting devices have been developed. However, it often occurs that when a child remains in one place for a period of time he may become sleepy. At other occasions a bed is required for a small child which will also protect him from rolling or falling as would be the case with normal size beds. When the child awakes it is desirable to have a seat available.

In order to solve the foregoing problems, a child's convertible bed and seat was developed and is shown in Berlin Patent No. 3,124,388, dated March 10, 1964.

Such a child's convertible bed and car seat included a forward portion to serve as a seat portion and a rearward portion to serve as a back portion with the forward and rearward portions being positioned between side members and hingedly secured together along a common edge. Cam means in the nature of a U-shaped track were provided whereby at one extremity of the cam track the device was positioned so that the seat portion and back portion were essentially perpendicular to each other to form a supporting seat, whereas in the other cam extremity the seat and back portions lay in a single horizontal plane and thus the device served as a bed.

The aforesaid device has proved to be successful. Yet it has been discovered that there are times when the child would be more comfortable in a position intermediate the bed position and seat position of the aforesaid device. Towards this end it is now recognized herein that it is most desirable to provide a convertible bed and seat that can be adjusted in accordance with the needs of the child.

It is therefore an object of the present invention to provide a device which can be simply and easily adjusted from a position as a chair to that of a bed and vice versa.

A further object of the present invention is to provide a device wherein the relationship between the seat portion and back portion can be varied as desired to provide a seat of desired inclination or a bed.

The foregoing as well as other objects of the invention are achieved by providing the seat portion and back portion as separate elements pivotally mounted on a frame. One of the portions, for instance, the seat portion, can also be longitudinally adjustable as well as pivotally adjustable. This is accomplished by attaching to the seat portion a side link with an elongated track that will permit both pivotal and longitudinal movement. Furthermore, the seat portion and back portion are pivotally united together by means of pivotally securing the aforesaid seat portion side link to the back portion with the pivotal relationship being modified as desired by the operation of a hand crank. In addition, the aforesaid pivotal and longitudinal movement can take place in connection with a spring which renders the aforesaid pivotal securement resilient and further minimizes any binding tendency in the movement in connection with the elongated track.

Other objects and many of the attendant advantages of the invention will become readily appreciated as the same becomes better understood by reference to the following detailed description when considered in connection with the accompanying drawings wherein:

FIG. 3 is a sectional view similar to FIG. 2 but wherein the device has been brought to a position as a bed;

FIG. 4 is a sectional view taken along the lines 4—4 of FIG. 3;

FIG. 5 is an enlarged fragmentary perspective view showing the connection of the forward tip of the crank to a cross member;

FIG. 6 is a greatly enlarged fragmentary sectional view showing the disposition of the crank rod as it passes through a bearing frame adjacent its rear end;

FIG. 7 is a perspective view similar to FIG. 2 which shows another embodiment of the present invention incorporating a spring that is associated with the elongated track and the pivotal connection of the seat portion and the back portion;

FIG. 8 is a bottom plan view of the embodiment of FIG. 7 with portions broken away for the sake of clarity;

FIG. 9 is a fragmentary perspective enlarged exploded view showing the association of one end of the spring member with the pivotal connection of the seat portion and the back portion; and FIG. 10 is a greatly enlarged fragmentary sectional view similar to FIG. 6 showing the disposition of the crank rod of the device of FIG. 7 as it passes through a bearing frame adjacent its rear end.

Figures 1, 2:
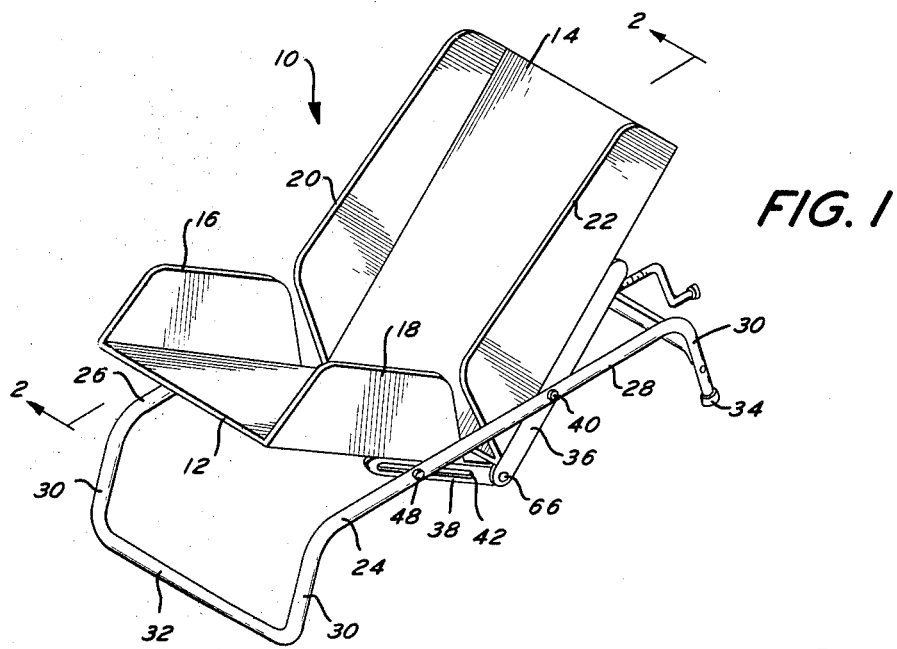
FIG. 1 is a perspective view of the crank operated child's convertible bed and seat embodying the present invention.
FIG. 2 is an enlarged sectional view taken along the lines 2—2 of FIG. 1.

Referring now in greater detail to the various figures of the drawings wherein similar reference characters refer to similar parts, the improved crank operated child's convertible bed and seat constituting a first embodiment of the invention is generally shown at 10 in FIG. 1. The device 10 includes a seat portion 12 and a back portion 14 with the seat portion 12 having sides 16 and 18 and the back portion 14 having sides 20 and 22.

As will be discussed hereinafter, the seat portion 12 and the back portion 14 are pivotally and adjustably mounted upon a frame 24 including arms 26 and 28 that are bent both forwardly and rearwardly into front and rear legs 30. The front legs 30 are united respectively by a ground engaging cross bar 32 in the front thereof. The rear legs 30 have free ends which engage the ground and are closed by caps 34.

As shown in FIG. 2, an L-shaped elongated link 36 is secured to the underside of the back portion 14 along at least one edge thereof and preferably along both edges thereof (see FIG. 2). Similar L-shaped links 38 are secured along the underside of seat portion 12 at both edges thereof as shown in FIG. 4.

Each back portion link 36 is pivotally secured to an arm 28 of the frame 24 by pivotal connection 40 (FIG. 1).

As shown in FIGS. 1 and 2, each seat portion link 38 possesses an elongated track 42 which receives a cross pin 44 (FIG. 4) having free ends 46 that pass respectively through the arms 26 and 28 and terminate in fixed heads 48 outwardly of the arms 26 and 28. While the cross pin 44 is also fixed in position, the seat portion link 38 may move relative thereto in a pivoting and longitudinal movement from the position of FIG. 2 to the position of FIG. 3 by virtue of the action of crank 50 as will be described hereinafter.

As shown in FIGS. 2 and 4, the crank 50 is essentially an elongated rod 52 which passes through a brace 54 (FIG. 3) that is secured to rear legs 30 by fasteners 56 (FIG. 4). The elongated rod 52 terminates rearwardly in a grasping handle 58 as shown in FIG. 2. The forward tip 60 of the elongated rod 52 (FIG. 5) terminates in a head 62 which is spaced from restraining means 63. As shown in FIG. 5, the tip 60 passes through a support 64 which pivotally joins each pair of L-shaped links 36 and 38 together at 66 (FIG. 1). As shown in FIG. 5, the rod 52 passes through opening 68 in a collar 67 of the support 64. As further shown in FIG. 5, there is some play between the forward tip 60 and the link 64, but movement of the rod 52 is limited in one direction by the head 62 and by restraining means 63 in the other direction.

As shown in detail in FIG. 6, the passage of the crank 50 and particularly the rod 52 thereof through brace 54 is reinforced by an external plastic ferrule 69 and an internal bearing 70. Finally, as indicated in FIGS. 3 and 4, a cross rod 72 (or pins) is provided adjacent the rear legs 30 for additional support of the back portion 14 in the horizontal position.

It is thus seen that the device of the present invention can be converted from the position of FIG. 2 to the position of FIG. 3 or any intermediate position by a simple turning of the crank 50. As shown in FIG. 2, the crank 50 possesses external threads 74 that pass through an internally threaded opening in the bearing 70. When crank 50 is advanced forwardly to move device 10 from the seat position of FIG. 2 toward the bed position of FIG. 2 to the position of FIG. 3, the bearing 70 actually tilts somewhat and rod 52 moves from a slightly downwardly inclined position to a somewhat upwardly inclined position of FIG. 3. Thus, the bearing 70 is freely mounted within brace 54. As the handle 58 is turned so that the rod 52 is advanced forwardly in the direction of arrow 76 of FIG. 2, the L-shaped link 36 associated with the seat portion 12 is accordingly pivotted toward a horizontal position. This is because the pivotal connection 40 between L-shaped link 36 and back portion 14 is at all times a fixed distance from the pivotal connection 66 of the links 36 and 38. Hence, advancement of rod 52 necessarily causes collar 67 to rise in order to maintain the aforesaid fixed distance. However, collar 67 will rise only if link 38 can move forwardly and this is permitted by the action of pin 44 in elongated track 42.

It is thus seen that the seat position of the present device can be so adjusted that any precise angle of adjustment between the seat portion 12 and the back portion 14 can be obtained by the user. Also, the seat portion 12 and back portion 14 can be so adjusted to lie in a continuous horizontal plane and thereby constitute a bed. Where desired, a pad (not shown) may be placed upon the seat portion 12 to extend onto the back portion 14 in a manner as suggested in Berlin Patent No. 3,124,388.

As discussed in connection with the embodiment of FIGS. 1 to 6, the movement of the link 38 is limited and guided by the action of pin 44 in elongated track 42. In order to avoid a tendency for binding to occur between the track and pin, the embodiment of FIGS. 7 to 10 provides a coil spring which resiliently connects the pin to the pivotal connection of the links. In all other respects, however, the device of FIGS. 7 to 10 is essentially the same as the embodiment of FIGS. 1 to 6.

Therefore, the device 100 of FIGS. 7 to 10 includes seat portion 112 and back portion 114 with the seat portion 112 having sides 116 and the back portion 114 having sides 120. The seat portion 112 and the back portion 114 are pivotally and adjustably mounted upon a frame 124 including arms 126 and 128 that are bent both forwardly and rearwardly into front and rear legs 130. The front legs 130 are united respectively by a ground engaging cross bar 132 in the front thereof. The rear legs 130 have free ends which engage the ground and which are closed by caps 134.

An L-shaped elongated link 136 is secured to the underside of the back portion 114 along at least one edge thereof and preferably along both edges thereof (FIG. 8). Similar L-shaped links 138 are secured along the underside of the seat portion 112 at both edges thereof. Each back portion link 136 is pivotally secured to an arm 128 of the frame 124 by pivotal connection 140 (FIG. 7).

Each seat portion link 138 possesses an elongated track 142 which receives a cross pin 144 (FIG. 7) having free ends 146 that pass respectively through the arms 126 and 128 and terminate in fixed heads 148 outwardly of the arms 126 and 128. While the cross pin 144 is also fixed in position, the seat portion link 138 may move relative thereto in a pivoting and longitudinal movement in a manner as illustrated in FIGS. 2 and 3 in connection with the first embodiment of the present invention. Such movement occurs under the action of crank 150 as will be described hereinafter.

However, as previously discussed, binding may occur between the cross pin 144 and the elongated track 142 of the seat portion link 138. In order to minimize this, a coil spring 143 has one end secured to the cross pin 144 (FIG. 7) and has the other end secured to the pivotal connection of the links 136 and 138 as illustarted in FIG. 9. Thus, as the distance between the cross pin 144 and the pivotal connection of the links 136 and 138 is varied, the movement of the link 138 with respect to the cross pin 144 occurs either under the pressure of the spring 143 or against it. In either event, the movement of the link 138 with respect to the cross pin 144 takes place in a smooth manner to minimize binding.

The crank 150 is essentially an elongated rod 152 which passes through a brace 154 (FIG. 7) that is secured to the rear legs 130 by fasteners 156 (FIG. 9). The elongated rod 152 terminates rearwardly in a grasping handle 158. The forward tip 160 of the elongated rod 152 contains threads 161 and passes through a support 164 which pivotally joins each pair of L-shaped links 136 and 138 together at 166 (FIG. 9). As shown in FIG. 9, the threaded forward tip 160 passes through threaded opening 168 in nut 167 which is welded to the support 164. The opening 168 is aligned with a complementary opening in the support 164 to permit the passage of the threaded tip 160.

As shown in detail in FIG. 10, the passage of the crank 150 and particularly the rod 152 thereof through the brace 154 is reinforced by plastic ferrules 169 which extend through openings 171 in the brace 154. Attention is called to the fact that the openings 171 are somewhat larger than the outer diameter of the ferrules 169 in order to accommodate the tilting action of the crank 150 as was discussed in connection with the comparison of FIGS. 2 and 3.

The securement of an end of the spring 143 to the pivotal connection 166 of the links 136 and 138 is shown in detail in FIG. 9. This is effected by means of a pin 166A which passes through appropriate openings in the links 136 and 138. A small section 136A of the link 136 is cut away in order that there may be no interference with the relative pivoting of the links 136 and 138. The pin 166A passes through an opening 164A in the support 164. The end of the spring 143 is looped about the pin 166A and is sandwiched between washers 164B and 164C. The inner end of the pin 166A may then be flattened to complete the connection.

Finally, a cross rod 172 (or pins) is provided adjacent the rear legs 130 for additional support of the back portion 114 in the horizontal position.

The device of FIGS. 7 to 10 may be converted from the seat position of FIG. 7 to a bed position or any position intermediate thereto by a simple turning of the crank 150 much in the manner of operation as described in connection with the device of FIGS. 1 to 6 with the spring 143 minimizing any binding tendencies that may arise. Attention is called to the fact that in the embodiment of FIGS. 7 to 10 the tip of the rod 152 is threaded instead of the portion passing through the brace 54 as is shown in FIG. 2. It is found that this arrangement gives considerably more flexibility.

When the crank 150 is advanced forwardly to move device 100 from the seat position of FIG. 7 to a bed position, the ferrules 169 actually tilt somewhat and the rod 152 moves from a slightly downwardly inclined position of FIG. 7 to a somewhat upwardly inclined position, much in the manner of FIG. 3.

As the handle 158 is turned so that the rod 152 is advanced forwardly in the direction of arrows 176 of FIG. 7, the L-shaped link 136 associated with the seat portion 112 is accordingly pivoted toward a horizontal position. This is because the pivotal connection 140 between L-shaped link 136 and back portion 114 is at all times a fixed distance from the pivotal connection 166 of the links 136 and 138. Hence, the advancement of the rod 152 necessarily causes support 164 to rise in order to maintain the aforesaid fixed distance. However, the support 164 will rise only if forward link 138 can move forwardly and this is permitted by the action of pin 154 in elongated track 142 against the tension of spring 143. In the reverse operation of converting the bed to a seat, the link 138 will begin to tilt as the connection 166 moves closer to the pin 144. This also occurs with a minimum of binding since the spring 143 has a tendency to urge the connection 166 toward the pin 144.

Obviously, many modifications and variations of the present invention are possible in the light of the above teachings. It is, therefore, to be understood that within the scope of the appended claims, the invention may be practiced otherwise than as specifically described.

What is claimed as the invention is:

1. A crank operated child's convertible bed and seat comprising a frame, a seat portion pivotally mounted on said frame, a back portion pivotally mounted on said frame, seat portion link means associated with said seat portion, back portion link means associated with said back portion, said seat portion link means and said back portion link means being pivotally connected to said frame to provide said pivotal mounting, at least one of said link means including an elongated track which receives a cross pin, said cross pin and said track providing said pivotal connection for said one of said link means, said seat portion and said back portion being pivotally linked together, a transverse member including the pivotal linkage which joins said seat and back portion, said frame including a transverse member at one end thereof, and crank means adapted to move said one of said link means by movement of said track along said cross pin whereby said seat portion and back portion can be disposed at any desired angle with respect to each other between a seat position and a bed position by adjustment of said crank means, said crank means passing through both of said transverse members, with said crank means including threaded means on at least a portion of the exterior surface, said threaded means being cooperably engageable with threaded means on one of said transverse members through which said crank means passes.

2. The invention of claim 1 and further including spring means extending between said cross pin and said transverse member which includes said pivotal linkage.

References Cited by the Examiner

UNITED STATES PATENTS

| 1,419,319 | 6/1922 | Sisbower | 5—56 |
| 2,579,305 | 12/1951 | Cushman | 297—361 |
| 3,107,364 | 10/1963 | Simmons | 5—56 |
| 3,124,388 | 3/1964 | Berlin | 297—320 |
| 3,132,897 | 5/1964 | Linden | 297—322 |
| 3,142,512 | 7/1964 | Hamilton | 297—320 |

FOREIGN PATENTS 154,892  1/1953  Australia.

FRANK B. SHERRY, *Primary Examiner.*

F. K. ZUGEL, *Assistant Examiner.*